(12) United States Patent
Liu et al.

(10) Patent No.: US 8,681,281 B2
(45) Date of Patent: Mar. 25, 2014

(54) GROUNDING STRUCTURE FOR DISPLAY DEVICE

(75) Inventors: Hsuan-Chen Liu, Kaohsiung (TW); Sung-Chun Lin, Tainan (TW); Kun Cheng Lee, Tainan County (TW); Chia Hua Yu, Banciao (TW)

(73) Assignee: Hannstar Display Corporation, Taipei (TW)

( * ) Notice: Subject to any disclaimer, the term of this patent is extended or adjusted under 35 U.S.C. 154(b) by 636 days.

(21) Appl. No.: 12/560,570

(22) Filed: Sep. 16, 2009

(65) Prior Publication Data

US 2010/0225840 A1   Sep. 9, 2010

(30) Foreign Application Priority Data

Mar. 6, 2009   (TW) ............................... 98107483 A (51) Int. Cl.
*G02F 1/1333*   (2006.01)
*G02F 1/1345*   (2006.01)

(52) U.S. Cl.
USPC .............................. 349/40; 349/149; 349/151

(58) Field of Classification Search
USPC ..................................... 349/40, 38, 149, 151
See application file for complete search history.

(56) References Cited

U.S. PATENT DOCUMENTS

| 6,583,472 | B1 | 6/2003 | Shibata et al. | |
|---|---|---|---|---|
| 7,164,408 | B2 * | 1/2007 | Murade ......................... | 345/100 |
| 2007/0247582 | A1 * | 10/2007 | Mochizuki ..................... | 349/149 |
| 2008/0143908 | A1 * | 6/2008 | Bae et al. ........................ | 349/43 |

FOREIGN PATENT DOCUMENTS

CN    1286493 A    3/2001

\* cited by examiner

*Primary Examiner* — Nathanael R Briggs
(74) *Attorney, Agent, or Firm* — Volpe and Koenig, P.C.

(57) ABSTRACT

A grounding structure for a display device is provided. The grounding structure includes a substrate, a first connecting pad, a second connecting pad, a connecting structure and a grounding line. The first and second connecting pads are disposed on the substrate. The connecting structure electrically connects the first and second connecting pads. The first grounding line is disposed on the substrate, and has a length larger than two thirds of the projected length of the connecting structure on the surface of the substrate.

18 Claims, 5 Drawing Sheets

GROUNDING STRUCTURE FOR DISPLAY DEVICE

FIELD OF THE INVENTION

The present invention relates to a grounding structure for a display device, especially to a grounding structure for a liquid crystal display device with the thin and slim-bezel designs able to solve the electromagnetic interference.

BACKGROUND OF THE INVENTION

Currently the display devices have the trend toward the thin and slim-bezel designs. These display devices include LCD TVs, LCD monitors, notebook PCs, consumer electronics, etc.

These thin and slim-bezel designs are accomplished by using the cascade circuit to transmit the transistor-transistor logic (TTL) signals instead of the originally frequently used reduced swing differential signaling (RSDS) signal. The usage of the cascade circuit to directly transmit the system signals in the substrate of the display device can reduce the quantity of the flexible printed circuit (FPC) to be used and the size of the printed circuit board (PCB). Besides the cost saving, the space in the bezel can be saved, and the thickness of the module can be reduced.

Please refer to FIG. 1, which is the schematic diagram showing the side view of the cascade circuit of the driver integrated circuit of the prior art. The connecting pads 11 and 12 are disposed on substrate 10. The insulating layer 14 covers substrate 10 and connecting pads 11 and 12. The portions of the insulating layer 14 just above connecting pads 11 and 12 are etched to form small openings. The metal line 18 is coated on the portion of insulating layer 14 between connecting pads 11 and 12. Then, protecting layer 15 is coated above metal line 18 and insulating layer 14. The portion of protecting layer 15 right above connecting pads 11 and 12, and the top portions of metal line 18 close to two ends are etched to form openings. The transparent connecting layers 16 and 17 are coated above these openings to be electrically connected with the conducting elements (not shown in FIG. 1), e.g. the bump of driver IC chip, of the integrated circuit. It can be seen from FIG. 1 that connecting pad 11 is electrically connected with connecting pad 12 through transparent connecting layer 17, metal line 18 and transparent connecting layer 16 so as to reach the function of transmitting signals.

Although the cascade techniques have successfully made the products into a slim shape, some problems ensue in the following.

(I) Two band issue: For an example of a product with 800×480 pixels, since the cascade circuit replaces the past configuration of one FPC corresponding to one IC, the IC is used to drive the next IC instead. Therefore, the power line must pass the conducting line on the glass for the transmissions. Since the impedance of the metal material on the glass is larger than that of the copper wire of FPC, the impedance of the conducting line and the induced capacity become too large, i.e. RC loading too large, and accordingly the electrical power decays to cause unusual signals outputted by the IC and to result in the phenomenon of two bands. For example, the upper and lower blocks with different brightness appear on the screen.

(II) Electromagnetic interference (EMI) issue: The issue of impedance matching needs to be considered under the high-frequency operation. When the impedance is not matched or not well matched, the signals from the transmitting end can not be completely received by the receiving end, and will be reflected to result in electro-magnetic scattering and to cause the EMI effect. The current solutions are done by increasing the distance between the conducting lines (for example, the distance between the metal lines 18 in FIG. 1) and by improving the shapes of the conducting lines. Then more space is needed, the impedance of the conducting line can not be reduced, and the driving power of IC will be affected to result in the problem of two bands.

In order to solve the above mentioned problems and to meet the market requirements, the development team of the present invention has done a lot of deep analyses and researches. Finally the novel circuit structures are developed after plenty of experiments and improvements with the proofs of being able to solve the above mentioned two problems after a lot of trials, and can meet the requirements of the thin and slim-bezel designs. The present invention is described below.

SUMMARY OF THE INVENTION

The present invention provides grounding structures for the system transmission circuits for the display devices. The electro-magnetic interference can be reduced, and the requirements of the ultra-slim and slim-bezel designs for the products can be met by the present invention.

In accordance with one aspect of the present invention, a grounding structure for a display device is provided. The grounding structure comprises a substrate having a plane; a plurality of pairs of connecting pads disposed on the substrate; a plurality of connecting structures having a projected length on the plane of the substrate, wherein each pair of the connecting pads is connected to each other through one of the plurality of connecting structures; and a first grounding line having a length, and disposed on the substrate and in one of places above and below the plurality of connecting structures, wherein the length of the first grounding line is longer than two thirds of the projected length of the plurality of connecting structures.

Preferably, the grounding structure further comprises an insulating layer disposed among the first grounding line and the plurality of connecting structures and among the first grounding line and the plurality of pairs of connecting pads for insulating the first grounding line from the plurality of pairs of connecting pads and the plurality of connecting structures.

Preferably, each of the plurality of connecting structures comprises a transparent connecting layer and a metal line, and the transparent connecting layer comprises a material being one selected from a group consisting of indium tin oxide, indium zinc oxide, zinc oxide, aluminum zinc oxide and antimony tin oxide.

Preferably, the first grounding line is electrically connected to one of a grounding and a unipotential, and the length of the first grounding line is in a range of ¾ to ⅚ time of the length of the plurality of connecting structures.

Preferably, the grounding structure further comprises a second grounding line disposed in one of places above and below the first grounding line.

Preferably, the first grounding line has a width, and corresponds to one of the plurality of connecting structures, and the width of the first grounding line is in a range of a half to a double of that of the corresponding one of the plurality of connecting structures.

Preferably, the first grounding line has a width, and corresponds to one of the plurality of connecting structures, and the width of the first grounding line is in a range of 0.8 to 1.3 times that of the corresponding one of the plurality of connecting structures.

Preferably, the first grounding line has a width, the plurality of connecting structures have a total width, and the width of the first grounding line is in a range of 0.8 to 1.3 times the total width of the plurality of connecting structures.

In accordance with another aspect of the present invention, a grounding structure for a display device is provided. The grounding structure comprises a substrate having a plane; a first connecting pad disposed on the substrate; a second connecting pad disposed on the substrate; a connecting structure including at least a connecting layer and a connecting line, wherein the first and the second connecting pads are electrically connected through the connecting structure; and a first grounding line having a length and insulated from the connecting layer, wherein the first grounding line and the connecting layer together form a first conducting layer, the connecting structure has a projected length on the plane of the substrate, and the length of the first grounding line is larger than two thirds of the projected length of the connecting structure.

Preferably, the grounding structure further comprises an insulating layer disposed between the connecting structure and the first grounding line for insulating the connecting structure from the first grounding line, wherein the first conducting layer comprises a material being one selected from a group consisting of indium tin oxide, indium zinc oxide, zinc oxide, aluminum zinc oxide and antimony tin oxide.

Preferably, the connecting structure further includes a connecting line, wherein the connecting layer is electrically connected with the connecting line; the first grounding line is disposed in one of places above and below the connecting structure.

Preferably, the grounding structure further comprises a second grounding line disposed in one of places above and below the first grounding line.

Preferably, the first grounding line is disposed right below the connecting structure.

Preferably, the first grounding line is disposed right below the connecting structure, and the first grounding line has a width being in a range of 0.8 to 1.3 times that of the connecting structure.

In accordance with a further aspect of the present invention, a grounding structure for a display device is provided. The grounding structure comprises a substrate having a plane; a first connecting pad disposed on the substrate; a second connecting pad disposed on the substrate; a connecting structure electrically connected with the first and second connecting pads; and a first grounding line having a length, and disposed on the substrate and in one of places above and below the connecting structure, wherein the connecting structure has a projected length on the plane of the substrate, and the length of the first grounding line is larger than two thirds of the projected length of the connecting structure.

Preferably, the grounding structure further comprises an insulating layer disposed between the first grounding line and the connecting structure and among the first grounding line and the first and the second connecting pads for insulating the first grounding line from the first and the second connecting pads and the connecting structure.

Preferably, the connecting structure comprises at least a transparent connecting layer and a metal line; the transparent connecting layer comprises a material being one selected from a group consisting of indium tin oxide, indium zinc oxide, zinc oxide, aluminum zinc oxide and antimony tin oxide; and the first grounding line has a width being in a range of 0.8 to 1.3 times that of the metal line.

Preferably, the length of the first grounding line is in a range of ¾ to ⅚ time the projected length of the connecting structure.

Preferably, the first grounding line has a width being in a range of a half to a double of that of the connecting structure.

Preferably, the grounding structure further comprises a second grounding line disposed in one of places above and below the first grounding line.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

First Embodiment

Figure 1:
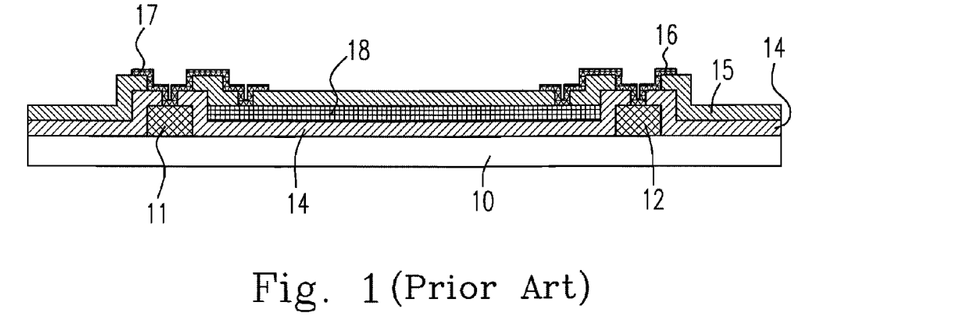
FIG. 1 is the schematic diagram showing the cross-sectional side view of the cascade circuit of the driver integrated circuit of the prior art.
Figure 2:
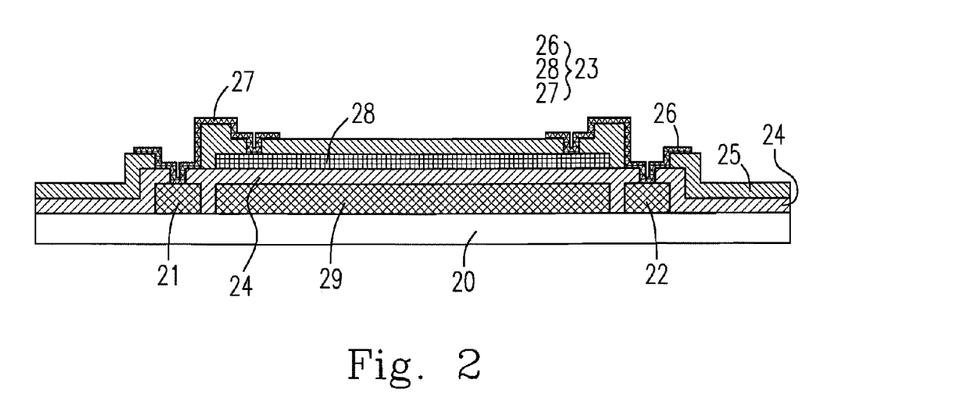
FIG. 2 is the schematic diagram showing the cross-sectional side view of the cascade circuit of the driver integrated circuit having the grounding structure in the first embodiment of the present invention.

Please refer to FIG. 2, which is the schematic diagram showing the cross-sectional side view of the cascade circuit of the driver integrated circuit having the grounding structure in the first embodiment of the present invention. The first connecting pad 21, second connecting pad 22 and first grounding line 29 are disposed on substrate 20. The first grounding line 29 is located between first 21 and second 22 connecting pads. The insulating layer 24 covers substrate 20, first connecting pad 21, second connecting pad 22 and first grounding line 29 so as to insulate first grounding line 29 from first 21 and second 22 connecting pads. The portions of insulating layer 24 above first connect pad 21 and second connecting pad 22 are respectively etched to form openings, e.g. through holes. The metal line 28 is coated on the portion of insulating layer 24 above first grounding line 29. Then, protecting layer 25 is coated on metal line 28 and insulating layer 24. The portions of protecting layer 25 above first 21 and second 22 connecting pads, and the portions of protecting layer 25 above and close to two ends of metal line 28 are etched to form the openings. The transparent connecting layers 26 and 27 are coated above these openings. The metal line 28 and transparent connecting layers 26 and 27 together constitute the connecting structure 23. The transparent connecting layers 26 and 27 can be electrically connected with the conducting elements, e.g. conducting bumps of driver IC chips, of the integrated circuit, respectively. The first grounding line 29 is insulated from first 21 and second 22 connecting pads, metal line 28 and transparent connecting layers 26 and 27 by means of insulating layer 24. Preferably, first grounding line 29 can be electrically connected with a fixed potential (not shown in Figures) or a grounding (not shown in Figures) optionally. It can be seen from FIG. 2 that first connecting pad 21 is electrically connected with second connecting pad 22 to reach the function of transmitting signals through connecting structure 23, i.e. through transparent connecting layer 27, metal line 28 and transparent connecting layer 26.

The materials of transparent connecting layers 26 and 27 can be selected from at least one of indium tin oxide, indium zinc oxide, zinc oxide, aluminum zinc oxide and antimony tin oxide, etc.

The first grounding line 29 is disposed below connecting structure 23 to reach the purpose of the thin or slim structure. The width of first grounding line 29 can be in a range of a half to a double of that of connecting structure 23. Preferably, the width of first grounding line 29 is approximately equal to or a little bit wider than that of connecting structure 23. Preferably, the width of first grounding line 29 is approximately equal to or a little bit wider than that of metal line 28 of connecting structure 23. For instance, the width of first grounding line 29 can be in a range of 0.8 to 1.3 times that of metal line 28 so as to save the space and materials and to reach the better effect of preventing EMI. The present embodiment is described only for the illustration only. Practically, first grounding line 29 can be designed as located above connecting structure 23 as well.

In this embodiment, first grounding line 29 can conduct and diminish the scattered electro-magnetic wave so as to solve the EMI problem in the prior art, and simultaneously the purposes of thin and slim designs can be reached with the additional advantages of saving cost. In addition, the length of first grounding line 29 in the present embodiment, i.e. the length shown in the cross-sectional side view of FIG. 2, can be larger than two thirds of the projected length of connecting structure 23 projected on the plane of substrate 20, or larger than third fourths of that of metal line 28. Preferably, the length of first grounding line 29 can be in a range of ¾ to ⅚ time the projected length of connecting structure 23 projected on the plane of substrate 20, or in a range of ¾ to 1 time that of metal line 28 so as to more effectively solve the EMI problem.

On the other hands, first grounding line 29 and first 21 and second 22 connecting pads can be simultaneously formed in the same metal layer without introducing any additional process, and thus there is an advantage of cost-effectiveness.

Second Embodiment

Another embodiment of the present invention is introduced as follows. The grounding structure of the present embodiment is similar to that of the first embodiment. The major differences are: only one pair of connecting pads, i.e. first 21 and second 22 connecting pads, in the first embodiment; while plural pairs of connecting pads in the present embodiment.

Figure 3A:
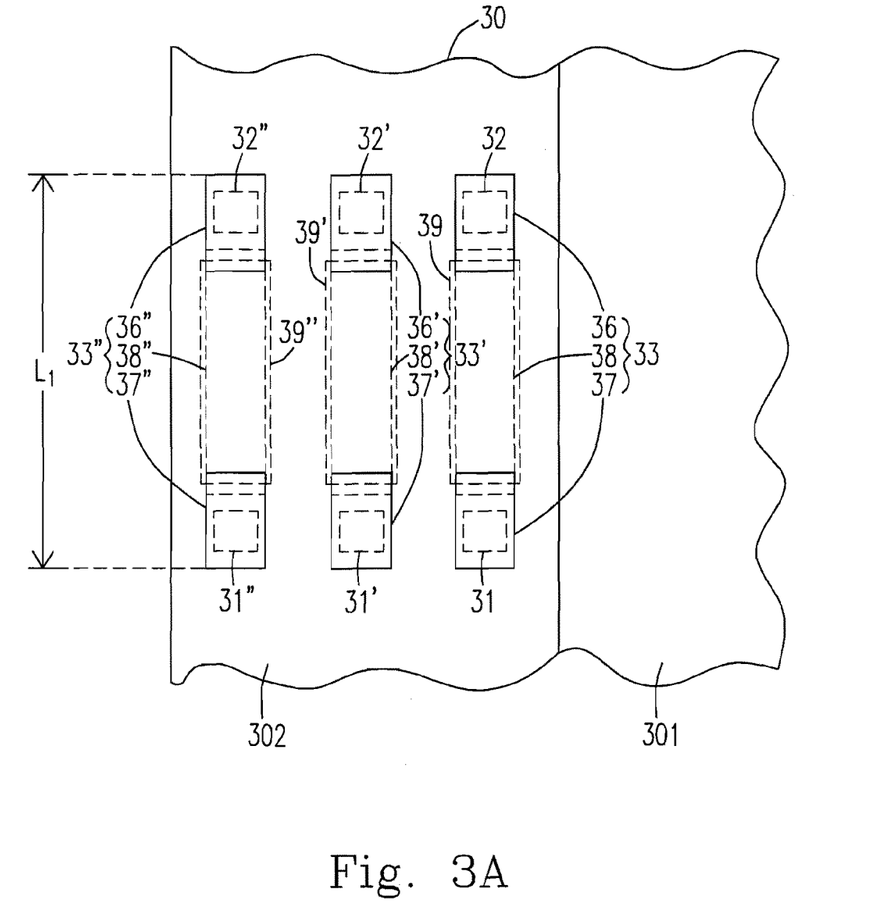
FIG. 3A is the schematic diagram showing the top view of the cascade circuit of the driver integrated circuit having the grounding structure in the second embodiment of the present invention.

Please refer to FIG. 3A, which is the schematic diagram showing the top view of the cascade circuit of the driver integrated circuit having the grounding structure in the second embodiment of the present invention. There are a plurality of pairs of the connecting pads disposed on substrate 30, including the first pair of connecting pads, i.e. connecting pads 31 and 32, the second pair of connecting pads, i.e. connecting pads 31' and 32', and the third pair of connecting pads, i.e. connecting pads 31" and 32", which are electrically connected with connecting structure 33, 33' and 33", respectively. The first grounding lines 39, 39' and 39" and the plural pairs of connecting pads can be simultaneously formed in the same metal layer without any additional process similarly as those in the first embodiment. Meanwhile, first grounding lines 39, 39' and 39" respectively corresponds to the plural connecting structures 33, 33' and 33", and are respectively located below the plural connecting structures 33, 33' and 33". Preferably, each first grounding line can be located right below the corresponding connecting structure optionally. In other embodiments, the relative locations of the first grounding line and the connecting structures can be appropriately adjusted. In this embodiment, the "right below" (or "right above") means that the central lines of the projections of the corresponding first grounding line and the connecting structure on the plane of the substrate 30 along the long direction are approximately overlapped. Referring to FIG. 3A, the width of each of first grounding lines 39, 39' and 39" can be approximately equal to or a little bit wider than that of the corresponding connecting structure. Preferably, the width of each of first grounding lines 39, 39' and 39" can be approximately equal to or a little bit wider than that of the corresponding metal lines 38, 38' and 38" of connecting structures 33, 33' and 33". For example, the width of each of first grounding lines 39, 39' and 39" can be in a range of 0.8 to 1.3 times that of the corresponding metal lines 38, 38' and 38" so as to save the space and materials and to reach the better effect of preventing EMI. The length of each of first grounding lines 39, 39' and 39" can be larger than two thirds of the projected length $L_1$ of the plural connecting structures 33, 33' and 33" projected on the plane of substrate 30, or larger than three fourths of that of metal lines 38, 38' and 38". Preferably, the length of each of first grounding lines 39, 39' and 39" can be in a range of ¾ to ⅚ time the projected length $L_1$ of the plural connecting structure 33, 33' and 33" projected on the plane of substrate 30, or in a range of ¾ to 1 time that of metal lines 38, 38' and 38".

Figure 3B:
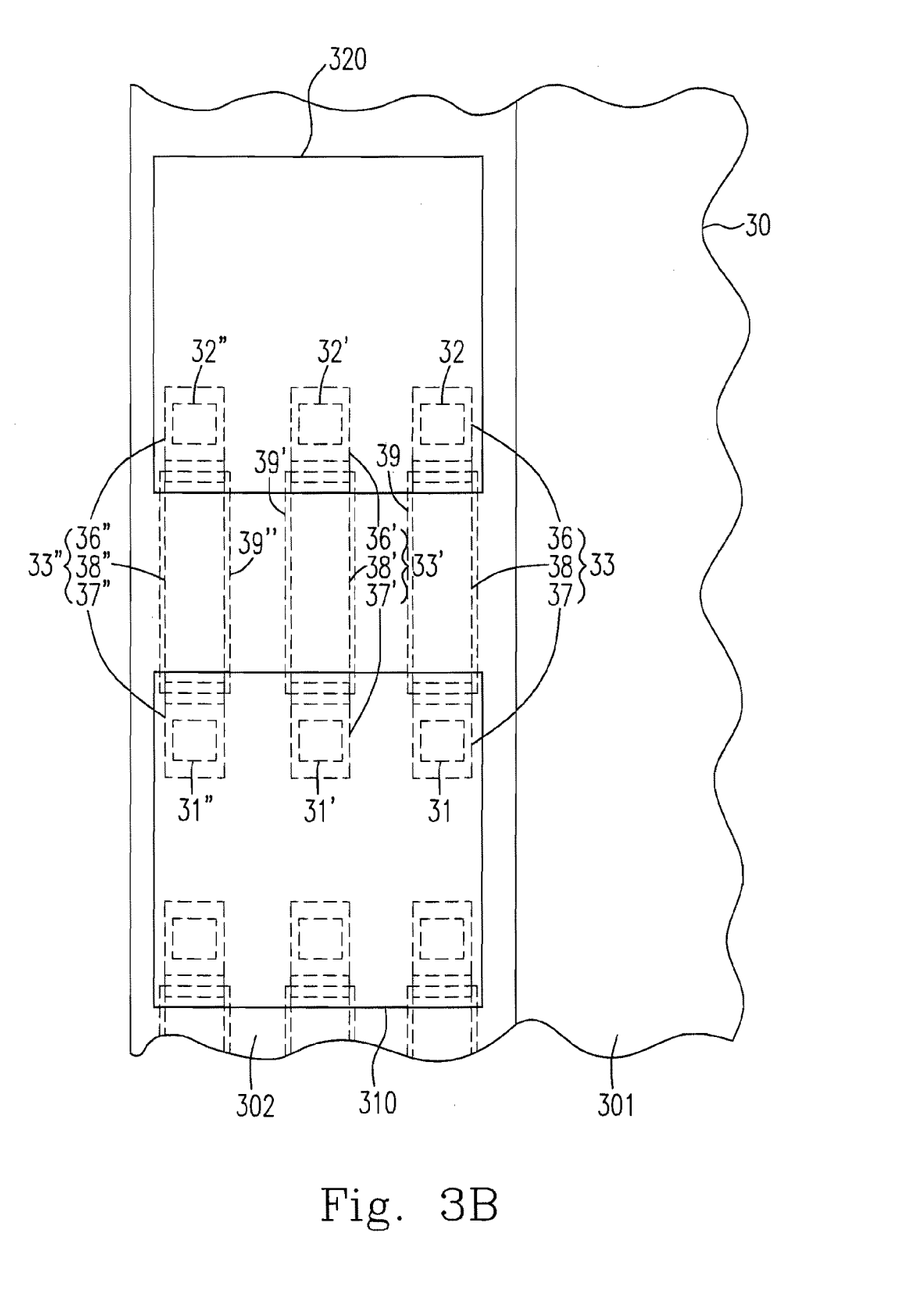
FIG. 3B is the schematic diagram showing the top view of the cascade circuit of the driver integrated circuit having the grounding structure and including the driver chip in the second embodiment of the present invention.

Please refer to FIG. 3B, which is the schematic diagram showing the top view of the cascade circuit of the driver integrated circuit having the grounding structure and including the driver chip in the second embodiment of the present invention, where more elements, i.e. driver chips 310 and 320 disposed above transparent connecting layers 36, 36', 36", 37, 37' and 37", are shown in FIG. 3B as compared to FIG. 3A. The packaging of the above-mentioned driver chips can be done by adopting the technique of chips on glass (COG). The driving signals outputted by driver chip 320 can be transmitted to driver chip 310 through connecting structures 33, 33' and 33". It is noted that the above-mentioned connection method of the grounding structures to the driver chips is only one of the available methods, and the applications of the grounding structures in the present invention are not restricted to the above connection method.

Please refer to FIG. 3A or 3B. The grounding structures of present embodiment are usually located on the edge of the display panel and in the non-display area 302 outside the display area 301, as shown in FIG. 3A or 3B. The display area 301 contains plural gate lines and data lines (not shown in Figures) intersecting with one another for displaying the pictures.

The widths of metal lines 38, 38' and 38" of the plural connecting structures 33, 33' and 33" in this embodiment are approximately equal to those of first pair connecting pads 31 and 32, second pair connecting pads 31' and 32' and third pair connecting pads 31" and 32", respectively. Actually, the widths of metal lines 38, 38' and 38" of the plural connecting structures 33, 33' and 33" can be in a range of one half to double of those of first pair connecting pads 31 and 32, second pair connecting pads 31' and 32' and third pair connecting pads 31" and 32", respectively. The design of equal widths is just one preferred embodiment.

In this embodiment, the widths of metal lines 38, 38' and 38" are uniform, but actually can be designed to be narrower around two ends and wider in the middle portion, or to be variable along the long direction. Meanwhile, the widths of first grounding lines 39, 39' and 39" can be also variable following those of connecting structures 33, 33' and 33". That is, the widths of first grounding lines 39, 39' and 39" in any portion can be designed to be larger than or approximately equal to those of metal lines 38, 38' and 38" so as to reach the better effect of reducing EMI.

In this embodiment, since there are first grounding lines 39, 39' and 39" located below the corresponding connecting structure 33, 33' and 33", respectively, the scattered electro-magnetic waves can be conducted and diminished, and accordingly the EMI problem in the prior art can be effectively solved.

Third Embodiment

Another embodiment is introduced as follows. The grounding structures of the present embodiment are similar to those in the second embodiment. The major difference is: there are plural grounding lines 39, 39' and 39" in the second embodiment; while there is only one grounding line 49 in this embodiment to cover the located areas and intervals of the plural grounding lines in the second embodiment.

Figure 4:
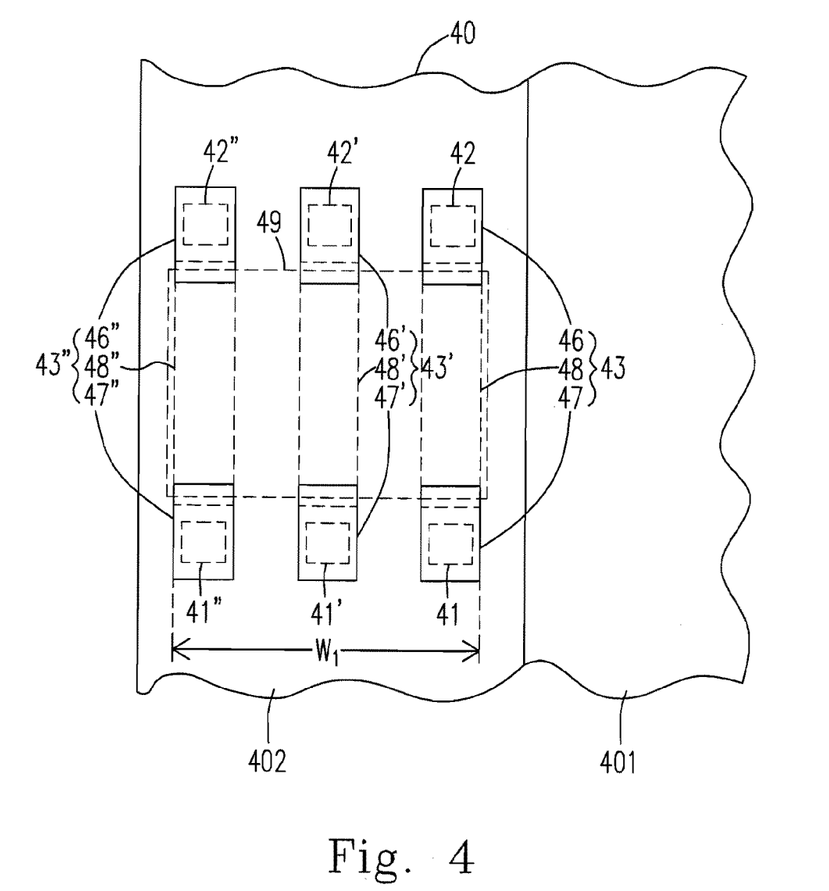
FIG. 4 is the schematic diagram showing the top view of the cascade circuit of the driver integrated circuit having the grounding structure in the third embodiment of the present invention.

Please refer to FIG. 4, which is the schematic diagram showing the top view of the cascade circuit of the driver integrated circuit having the grounding structure in the third embodiment of the present invention. There are plural pairs of connecting pads disposed on substrate 40, including first pair of connecting pads, i.e. connecting pads 41 and 42, second pair of connecting pads, i.e. connecting pads 41' and 42', and third pair of connecting pads, i.e. connecting pads 41" and 42". In this embodiment, the plural connecting structures 43, 43' and 43" are electrically connected with the first, second and third pairs of connecting pads. The first grounding line 49 and the plural pairs of connecting pads in this embodiment can be simultaneously formed in the same metal layer without additional process as similarly those in the first embodiment. Meanwhile, first grounding line 49 is disposed below the plural connecting structures 43, 43' and 43". Preferably, first grounding line 49 can be disposed right below the plural connecting structures 43, 43' and 43" optionally. In this embodiment, the "right below" (or "right above") means that the central line of the projection of first grounding line 49 projected on the plane of substrate 40 along the long direction will pass the center of the cross width $W_1$ (as shown in FIG. 4) of the plural connecting structures 43, 43' and 43".

It can be seen from the top view of FIG. 4 that the width of first grounding line 49 covers the cross width of the plural connecting structures 43, 43' and 43". Preferably, the width of first grounding line 49 is approximately equal to or a little bit larger than cross width $W_1$ of the plural connecting structures 43, 43' and 43". For example, the width of first grounding line 49 is in a range of 0.8 to 1.3 times $W_1$. The length of first grounding line 49 is larger than two thirds of the projected length of the plural connecting structures 43, 43' and 43" projected on the plane of substrate 40, or larger than ¾ time the length of metal lines 48, 48' and 48". Preferably, the length of first grounding line 49 is in a range of ¾ to ⅚ time the projected length of the plural connecting structures 43, 43' and 43" projected on the plane of substrate 40, or in a range of ¾ to one time the length of metal lines 48, 48' and 48". The scattered electro-magnetic waves can be conducted and diminished, and the EMI problem in the prior art can be effectively solved by adopting the design of first grounding line 49 in this embodiment.

Similarly, the grounding structures in this embodiment are usually located on the edge of the display panel, i.e. in non-display area 402 outside display area 401 as referring to FIG. 4. The display area 401 contains plural gate lines and data lines (not shown in Figures) intersecting with one another for displaying the pictures.

Please refer to FIGS. 2 and 4 together, the grounding structure in this embodiment can include an insulating layer (shown in FIG. 2, not shown in FIG. 4) similar to that in the first embodiment. The insulating layer is located among first grounding line 49 and the plural connecting structures 43, 43' and 43", and among first grounding line 49 and the plural connecting pads 41, 42, 41', 42', 42", and 42" so as to insulating first grounding line 49 from the plural connecting structures 43, 43' and 43" and the plural connecting pads 41, 42, 41', 42', 42", and 42". Preferably, first grounding line 49 can be electrically connected to a fixed potential (not shown in Figures) or a grounding (not shown in Figures) optionally.

The connecting structure 43 in this embodiment can include metal line 48 and transparent connecting layers 46 and 47; the connecting structure 43' in this embodiment can include metal line 48' and transparent connecting layers 46' and 47'; the connecting structure 43" in this embodiment can include metal line 48" and transparent connecting layers 46" and 47". The materials of the transparent connecting layers can be selected from at least one of indium tin oxide, indium zinc oxide, zinc oxide, aluminum zinc oxide, antimony tin oxide, etc.

In this embodiment, first grounding line 49 can be located above or below the plural pairs of connecting pads without occupying additional space so as to reach the design of slim bezel. In this embodiment, a second grounding line can be further introduced to further reduce EMI, depending on the practical requirements. The second grounding line can be located above or below first grounding line 49 without occupying additional space so as to reach the design of slim bezel as well.

Fourth Embodiment

The fourth embodiment is introduced as follows. Please refer to FIG. 5, which is the schematic diagram showing the cross-sectional side view of the cascade circuit of the driver integrated circuit having the grounding structure in the fourth embodiment of the present invention. There are first 51 and second 52 connecting pads disposed on substrate 50. The insulating layer 54 covers substrate 50 and first 51 and second 52 connecting pads. The portions of insulating layer 54 above first 51 and second 52 connecting pads are etched to form small openings. The connecting line 58 is coated above the portion of insulating layer 54 between first 51 and second 52 connecting pads. The protecting layer 55 is coated above insulating layer 54 and connecting line 58. The portions of protecting layer 55 above first 51 and second 52 connecting pads and around two ends of connecting layer 58 are etched to form openings. The connecting layers 56 and 57 are coated above these openings. The grounding line 59 is coated between connecting layers 56 and 57, and is insulated from connecting layers 56 and 57 and connecting line 58. Preferably, first grounding line 59 can be electrically connected to a fixed potential (not shown in Figures) or a grounding (not shown in Figures) optionally.

Figure 5:
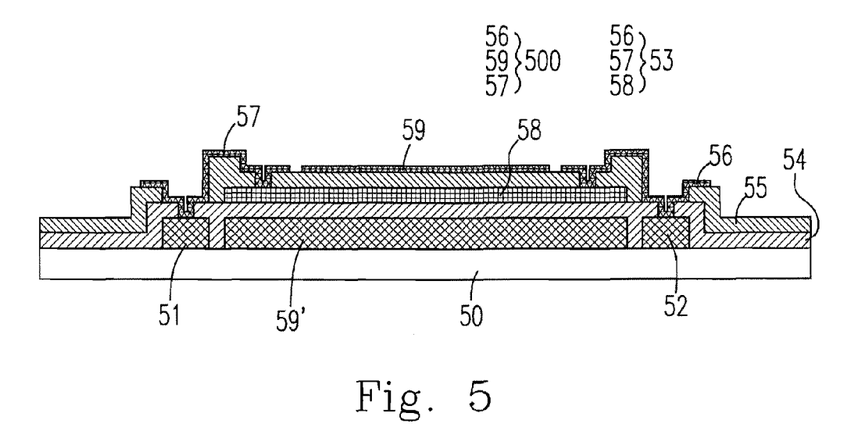
FIG. 5 is the schematic diagram showing the cross-sectional side view of the cascade circuit of the driver integrated circuit having the grounding structure in the fourth embodiment of the present invention.

In this embodiment, connecting layers 56 and 57 and connecting line 58 constitute connecting structure 53. The first connecting pad 51 is electrically connected with second connecting pad 52 through connecting structure 53.

It can be seen from FIG. 5 that first grounding line 59 and connecting layers 56 and 57 can be simultaneously formed in the same layer, i.e. first conducting layer 500, without additional process to produce first grounding line 59, which can conduct and diminish the scattered electro-magnetic waves to solve the EMI problem in the prior art. The length of first grounding line 59 in the present embodiment can be larger than two thirds of the projected length of connecting structure 53 projected on the plane of substrate 50, or larger than third fourths of that of connecting line 58. Preferably, the length of first grounding line 59 in the present embodiment can be in a range of ¾ to ⅚ time the projected length of connecting structure 53 projected on the plane of substrate 50, or in a range of ¾ to one time that of connecting line 58 to more effectively solve the EMI problem. The first grounding line 59 can be located above connecting structure 53 without occupying additional space so as to reach the design of slim bezel.

The above-mentioned connecting line 58 can be made of metal or other conducting materials. The first conducting layer 500 can be transparent conducting layer, and can be manufactured by using the original process of the transparent conducting layer in the thin film transistor (TFT) without additional process. The material of the transparent conducting layer can be chosen from at least one of indium tin oxide, indium zinc oxide, zinc oxide, aluminum zinc oxide, antimony tin oxide, etc.

Please refer to FIG. 5, second grounding line 59' can be optionally designed and disposed on substrate 50 and among first 51 and second 52 connecting pads and connecting line 58 in this embodiment. The second grounding line 59' is insulated from first 51 and second 52 connecting pads and connecting line 58 due to the insulation of insulation layer 54. Similarly and preferably, second grounding line 59' can be electrically connected to a fixed potential (not shown in Figures) or a grounding (not shown in Figures) optionally. Meanwhile, the EMI problem can be more effectively solved due to the coexistence of first 59 and second 59' grounding lines.

The correlations of the widths of first 59 and second 59' grounding lines and the width of connecting structure 53 in this embodiment is the same as those in the first and second embodiments, and would not be restated here.

The top view of this embodiment can be similar to those shown in FIGS. 3A, 3B and 4, but connecting structure 53 and first 59 and second 59' grounding lines in this embodiment can be single or plural, respectively.

The second grounding line 59', and first 51 and second 52 connecting pads in this embodiment can be simultaneously formed in the same layer, e.g. metal layer, and thus no additional process is needed. In addition, second grounding line 59' can be disposed below connecting structure 53, and thus would not occupy additional space, so the design of the slim bezel can be reached at the same time.

Fifth Embodiment

The fifth embodiment of the present invention is introduced as follows. Please refer to FIG. 6, which is the schematic diagram showing the cross-sectional side view of the cascade circuit of the driver integrated circuit having the grounding structure in the fifth embodiment of the present invention. The first 61 and second 62 connecting pads and connecting line 68 can be simultaneously formed in the same layer, and disposed on substrate 60. The insulating layer 64 is coated above substrate 60, first 61 and second 62 connecting pads and connecting line 68. The grounding line 69 is coated above the portion of insulating layer 64 between the first 61 and second 62 connecting pads. The protecting layer 65 can be optionally coated above insulating layer 64 and grounding line 69. The grounding line 69 is insulated from first 61 and second 62 connecting pads and connecting line 68. Preferably, first grounding line 69 can be optionally connected to a fixed potential (not shown in Figures) or to grounding (not shown in Figures).

Figure 6:
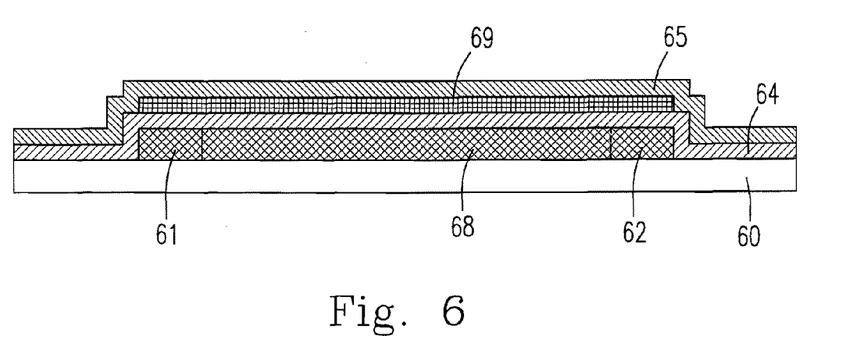
FIG. 6 is the schematic diagram showing the cross-sectional side view of the cascade circuit of the driver integrated circuit having the grounding structure in the fifth embodiment of the present invention.

The correlations between the width of grounding line 69 and that of connecting line 68 can be the same as those in the first and second embodiments, and would not restated here.

The top view of this embodiment can be similar to those shown in FIGS. 3A, 3B and 4, but connecting line 68 and grounding line 69 in this embodiment can be single or plural, respectively.

In this embodiment, the scattered electro-magnetic waves can be conducted and diminished, and the EMI problem in the prior art can be solved due to the design of grounding line 69 in this embodiment.

In conclusion, the present invention provides various grounding structures, which include at least one grounding line, which in turn can conduct and diminish the scattered electro-magnetic waves so as to solve the EMI problem in the prior cascade circuits. Meanwhile, the grounding line is disposed above or below the original connecting structure (or connecting layer), and thus would not occupy additional space, so the design of slim bezel can be simultaneously reached. Furthermore, all the grounding lines in the grounding structures of the present invention can utilize the original TFT manufacturing processes without additional process. That is to say, the ultra-slim and slim-bezel design can be reached, and the EMI problem in the cascade circuits of the prior art can be effectively solved without adding the cost.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A grounding structure for a display device, comprising:
   a substrate having a plane;
   a plurality of pairs of connecting pads disposed on the substrate;
   a plurality of connecting structures having a projected length on the plane of the substrate, wherein each pair of the connecting pads is connected to each other through one of the plurality of connecting structures;

a first grounding line having a length, and disposed on the substrate and in one of places above and below the plurality of connecting structures, wherein the length of the first grounding line is longer than two thirds of the projected length of the plurality of connecting structures; and an insulating layer disposed among the first grounding line and the plurality of connecting structures and among the first grounding line and the plurality of pairs of connecting pads for insulating the first grounding line from the plurality of pairs of connecting pads and the plurality of connecting structures.

2. A grounding structure according to claim 1, wherein each of the plurality of connecting structures comprises a transparent connecting layer and a metal line, and the transparent connecting layer comprises a material being one selected from a group consisting of indium tin oxide, indium zinc oxide, zinc oxide, aluminum zinc oxide and antimony tin oxide.

3. A grounding structure according to claim 1, wherein the first grounding line is electrically connected to one of a grounding and a unipotential, and the length of the first grounding line is in a range of ¾ to ⅚ time of the length of the plurality of connecting structures.

4. A grounding structure according to claim 1, further comprising a second grounding line disposed in one of places above and below the first grounding line.

5. A grounding structure according to claim 1, wherein the first grounding line has a width, and corresponds to one of the plurality of connecting structures, and the width of the first grounding line is in a range of a half to a double of that of the corresponding one of the plurality of connecting structures.

6. A grounding structure according to claim 1, wherein the first grounding line has a width, and corresponds to one of the plurality of connecting structures, and the width of the first grounding line is in a range of 0.8 to 1.3 times that of the corresponding one of the plurality of connecting structures.

7. A grounding structure according to claim 1, wherein the first grounding line has a width, the plurality of connecting structures have a total width, and the width of the first grounding line is in a range of 0.8 to 1.3 times the total width of the plurality of connecting structures.

8. A grounding structure for a display device, comprising:
a substrate having a plane;
a first connecting pad disposed on the substrate;
a second connecting pad disposed on the substrate;
a connecting structure including at least a connecting layer and a connecting line, wherein the first and the second connecting pads are electrically connected through the connecting structure;
a first grounding line having a length, insulated from the connecting layer, and disposed in one of places above and below the connecting structure, wherein the first grounding line and the connecting layer together form a first conducting layer, the connecting structure has a projected length on the plane of the substrate, and the length of the first grounding line is larger than two thirds of the projected length of the connecting structure; and
an insulating layer disposed between the connecting structure and the first grounding line for insulating the connecting structure from the first grounding line.

9. A grounding structure according to claim 8, wherein the first conducting layer comprises a material being one selected from a group consisting of indium tin oxide, indium zinc oxide, zinc oxide, aluminum zinc oxide and antimony tin oxide.

10. A grounding structure according to claim 8, wherein:
the connecting structure further includes a connecting line, wherein the connecting layer is electrically connected with the connecting line; and
the length of the first grounding line is in a range of ¾ to ⅚ time the projected length of the connecting structure.

11. A grounding structure according to claim 8, further comprising a second grounding line disposed in one of places above and below the first grounding line.

12. A grounding structure according to claim 8, wherein the first grounding line is disposed right below the connecting structure, and the first grounding line has a width being in a range of a half to a double of that of the connecting structure.

13. A grounding structure according to claim 8, wherein the first grounding line is disposed right below the connecting structure, and the first grounding line has a width being in a range of 0.8 to 1.3 times that of the connecting structure.

14. A grounding structure for a display device, comprising:
a substrate having a plane;
a first connecting pad disposed on the substrate;
a second connecting pad disposed on the substrate;
a connecting structure electrically connected with the first and second connecting pads;
a first grounding line having a length, and disposed on the substrate and in one of places above and below the connecting structure, wherein the connecting structure has a projected length on the plane of the substrate, and the length of the first grounding line is larger than two thirds of the projected length of the connecting structure; and
an insulating layer disposed between the first grounding line and the connecting structure and among the first grounding line and the first and the second connecting pads for insulating the first grounding line from the first and the second connecting pads and the connecting structure.

15. A grounding structure according to claim 14, wherein:
the connecting structure comprises at least a transparent connecting layer and a metal line;
the transparent connecting layer comprises a material being one selected from a group consisting of indium tin oxide, indium zinc oxide, zinc oxide, aluminum zinc oxide and antimony tin oxide; and
the first grounding line has a width being in a range of 0.8 to 1.3 times that of the metal line.

16. A grounding structure according to claim 14, wherein the length of the first grounding line is in a range of ¾ to ⅚ time the projected length of the connecting structure.

17. A grounding structure according to claim 14, wherein the first grounding line has a width being in a range of a half to a double of that of the connecting structure.

18. A grounding structure according to claim 14, further comprising a second grounding line disposed in one of places above and below the first grounding line.

* * * * *